United States Patent
Zhang et al.

(10) Patent No.: US 8,652,249 B2
(45) Date of Patent: Feb. 18, 2014

(54) AMINE SACRIFICIAL AGENTS AND METHODS AND PRODUCTS USING SAME

(71) Applicant: Ruetgers Polymers Limited, Quebec (CA)

(72) Inventors: Zhaozhou Zhang, San Antonio, TX (US); Russell L. Hill, San Antonio, TX (US); Brian Shaw, Elmendorf, TX (US)

(73) Assignee: Ruetgers Polymer Ltd., Quebec (CA)

( * ) Notice: Subject to any disclaimer, the term of this patent is extended or adjusted under 35 U.S.C. 154(b) by 0 days.

(21) Appl. No.: 13/725,076

(22) Filed: Dec. 21, 2012

(65) Prior Publication Data

US 2013/0206040 A1    Aug. 15, 2013

Related U.S. Application Data

(60) Continuation of application No. 13/329,782, filed on Dec. 19, 2011, now abandoned, which is a division of application No. 12/436,648, filed on May 6, 2009, now abandoned.

(51) Int. Cl.
   *C04B 16/00*    (2006.01)

(52) U.S. Cl.
   USPC .................................... 106/708; 106/823

(58) Field of Classification Search
   USPC .................................. 106/823, 708
   See application file for complete search history.

(56) References Cited

U.S. PATENT DOCUMENTS

| | | |
|---|---|---|
| 3,615,784 A | 10/1971 | Cattanach |
| 4,116,706 A | 9/1978 | Previte |
| 4,188,231 A | 2/1980 | Valore |
| 4,249,948 A | 2/1981 | Okada et al. |
| 4,257,815 A | 3/1981 | Hauser |
| 4,318,744 A | 3/1982 | Dodson |
| 4,328,145 A | 5/1982 | Bobrowski et al. |
| 4,351,671 A | 9/1982 | Rosenberg et al. |
| 4,453,978 A | 6/1984 | Okimura et al. |
| 4,547,223 A | 10/1985 | Goto et al. |
| 4,828,619 A | 5/1989 | Matsushita et al. |
| 4,948,429 A | 8/1990 | Arfaei |

(Continued)

FOREIGN PATENT DOCUMENTS

| | | |
|---|---|---|
| CA | 2335056 | 12/1999 |
| DE | 19528912 | 2/1996 |

(Continued)

OTHER PUBLICATIONS

Adamson et al., "Physical Chemistry of Surfaces," 6$^{th}$ ed., 1997.

(Continued)

*Primary Examiner* — John Uselding

(74) *Attorney, Agent, or Firm* — Meunier Carlin & Curfman, LLC

(57) ABSTRACT

A method of producing cementitious mixtures containing fly ash as one of the cementitious components, under air entrainment conditions is described. The method involves forming a mixture comprising water, cement, fly ash, optionally other cementitious materials, aggregate, conventional chemical admixtures, and an air entrainment agent and agitating the mixture to entrain air therein. Additionally, at least one amine sacrificial agent is included in the mixture. The cementitious mixtures and hardened concretes resulting from the method and fly ash treated with sacrificial agent, or air entrainment agent/sacrificial agent combinations, are also described.

31 Claims, 6 Drawing Sheets

(56) References Cited

U.S. PATENT DOCUMENTS

| | | |
|---|---|---|
| 5,110,362 A | 5/1992 | Hoarty et al. |
| 5,181,961 A | 1/1993 | Umaki et al. |
| 5,221,343 A | 6/1993 | Grauer et al. |
| 5,326,396 A | 7/1994 | Abdelrazig et al. |
| 5,326,397 A | 7/1994 | Abdelrazig et al. |
| 5,372,643 A | 12/1994 | Gosset et al. |
| 5,389,143 A | 2/1995 | Abdelrazig et al. |
| 5,413,634 A | 5/1995 | Shawl et al. |
| 5,431,729 A | 7/1995 | Hegge |
| 5,522,927 A | 6/1996 | Hegge |
| 5,527,387 A | 6/1996 | Anderson et al. |
| 5,556,460 A | 9/1996 | Berke et al. |
| 5,603,760 A | 2/1997 | Berke et al. |
| 5,604,273 A | 2/1997 | Kerkar et al. |
| 5,618,344 A | 4/1997 | Kerkar et al. |
| 5,622,558 A | 4/1997 | Berke et al. |
| 5,654,352 A | 8/1997 | MacDonald |
| 5,672,203 A | 9/1997 | Chatterji et al. |
| 5,679,150 A | 10/1997 | Kerkar et al. |
| 5,871,577 A | 2/1999 | Chatterji et al. |
| 5,904,764 A | 5/1999 | Verhille |
| 5,938,835 A | 8/1999 | Shawl et al. |
| 5,948,157 A | 9/1999 | McKenney et al. |
| 6,048,393 A | 4/2000 | Cheung et al. |
| 6,136,089 A | 10/2000 | Hurt et al. |
| 6,149,725 A | 11/2000 | Burge et al. |
| 6,166,119 A | 12/2000 | Matsuo et al. |
| 6,277,189 B1 | 8/2001 | Chugh |
| 6,277,191 B1 | 8/2001 | Budiansky et al. |
| 6,290,772 B1 | 9/2001 | Cheung et al. |
| 6,302,955 B1 | 10/2001 | Kerkar et al. |
| 6,355,100 B1 | 3/2002 | Hamabe et al. |
| 6,358,311 B1 | 3/2002 | Arai et al. |
| 6,372,038 B1 | 4/2002 | Kameta et al. |
| 6,398,866 B1 | 6/2002 | Wombacher et al. |
| 6,461,424 B1 | 10/2002 | Ramme et al. |
| 6,599,358 B1 | 7/2003 | Boggs |
| 6,616,751 B1 | 9/2003 | Maroy et al. |
| 6,626,663 B1 | 9/2003 | Zhu |
| 6,641,661 B1 | 11/2003 | Jardine et al. |
| 6,670,415 B2 | 12/2003 | Jardine et al. |
| 6,706,111 B1 | 3/2004 | Young |
| 6,712,900 B2 | 3/2004 | Wombacher et al. |
| 6,858,661 B2 | 2/2005 | Zhang et al. |
| 6,869,474 B2 | 3/2005 | Perez-Pena et al. |
| 6,875,266 B1 | 4/2005 | Naji et al. |
| 6,919,388 B2 | 7/2005 | Nishikawa et al. |
| 7,160,384 B2 | 1/2007 | Jardine |
| 7,485,184 B2 | 2/2009 | Hill et al. |
| 7,556,684 B2 | 7/2009 | Bury et al. |
| 7,892,349 B2 | 2/2011 | Hill et al. |
| 7,892,350 B2 | 2/2011 | Hill et al. |
| 7,901,505 B2 | 3/2011 | Hill et al. |
| 2003/0136307 A1 | 7/2003 | Ou et al. |
| 2004/0129180 A1 | 7/2004 | Boggs |
| 2004/0144287 A1 | 7/2004 | Tardiff et al. |
| 2004/0149175 A1* | 8/2004 | Zhang et al. ............... 106/823 |
| 2004/0200389 A1 | 10/2004 | Young |
| 2007/0051277 A1* | 3/2007 | Hill et al. ............... 106/638 |
| 2008/0110374 A1 | 5/2008 | Hill et al. |
| 2008/0156225 A1 | 7/2008 | Bury |
| 2009/0050023 A1 | 2/2009 | Buerge et al. |

FOREIGN PATENT DOCUMENTS

| | | | |
|---|---|---|---|
| EP | 0342011 | 11/1989 | |
| GB | 2292141 | 2/1996 | |
| JP | 56022665 | 3/1981 | |
| JP | 02180739 | 7/1990 | |
| JP | 04317447 | 11/1992 | |
| JP | 05024900 | 2/1993 | |
| JP | 08295545 | 11/1996 | |
| JP | 08295546 | 11/1996 | |
| JP | 08337449 | 12/1996 | |
| JP | 2002234763 | 8/2002 | |
| WO | 85/01500 | 4/1985 | |
| WO | 92/04292 | 3/1992 | |
| WO | 01/09055 | 2/2001 | |
| WO | 02/096823 | 12/2002 | |
| WO | 2004/067471 | 8/2004 | |
| WO | WO 2004/067471 | * 8/2004 | .............. C04B 28/02 |

OTHER PUBLICATIONS

"Air entraining agent for concrete-comprises an anionic surfactant and a glycol ether," Section Ch, Week 198117, Derwent Publications Ltd., London, GB, 1981.

Berke et al., "Improving concrete performance with shrinkage-reducing admixtures," ACI, SP-217, Mar. 2003.

"Clean Coal Technology Glossary," Illinois Clean Coal Institute Energy Research for a Cleaner Environment, www.icci.org/glossary.html, retrieved Jan. 9, 2008.

Davies, J.T., Proc. $2^{nd}$ International Congress on Surface Activity, vol. 1, p. 426-438, 1957.

"Definition of Fly Ash," Britannica Online Encyclopedia, http://www.britannica.com/dictionary?book=Dictionary&va=fly%20ash&query=fly%20ash, retrieved Jan. 9, 2008.

Dodson, V., "Concrete Admixtures. Structural Engineering Series," Van Nostrand Reinhold, p. 211, 1990.

"Glossary of Environmental Terms," San Bernardino County Fire Department, Hazardous Materials Division, www.sbcfire.org/hazmat/env_terms.asp, updated Oct. 1, 2001, retrieved Jan. 10, 2008.

Griffin, W.C., "Calculation of HLB Values of Non-Ionic Surfactants," Journal of the Society of Cosmetic Chemists, vol. 5, pp. 249-259, 1954.

Griffin, W.C., "Classification of Surface Active Agents by HLB," Journal of the Society of Cosmetic Chemists, vol. 1, pp. 311-326, 1949.

S. Hagiwara et al., "Air-Entraining Compositions for Fly Ash Concrete," Chem. Abstracts, vol. 114, No. 10, XP000191963, p. 359, Abstract No. 87553b (Mar. 11, 1991).

McGowan, J.C., "A new approach for the calculation of hydrophile-lipophile balance values of surfactants," Tenside, Surfacants, Detergents, vol. 27, No. 4, pp. 229-230, 1990.

Meylan et al., "Atom/fragment contribution method for estimating octanol-water partition coefficients," J. Pharm. Sci. vol. 84, pp. 83-92, 1995.

Ramachandran, V.S., "Concrete Admixtures Handbook. Properties, Sciences, and Technology", NOYES p. 626, 1984.

Ribeiro et al., "Effectiveness of shrinkage-reducing admixtures on different concrete mixtures," ACI, SP-217, 2003.

Rixom et al., "Chemical Admixtures for Concrete," E&FN Spon, $3^{rd}$ Edition, 1999.

Roncero et al., "Evaluation of the influence of a shrinkage reducing admixture on the microstructure and long-term behavior of concrete," Proc. Seventh CANMET/ACI Intl. Conf. on Superplasticizers and Other Chemical Admixtures in Concrete (Berlin), Supplementary papers, 207-226, 2003.

Schramm, Laurel L., "ACS Professional Reference Book," American Chemical Society, article The Language of Colloid and Interface Science, A dictionary of Terms, 1993.

Shoya et al., "Improvement of drying shrinkage and shrinkage cracking of concrete by special surfactants," Proceedings of the International RILEM Symposium, May 14-17, 484-495, 1990.

Sowada et al., "Calculation of hydrophile-lipophile balance (HLB) group numbers for some structural units of emulsifying agents", Tenside, Surfactants, Detergents, vol. 29, No. 2, pp. 109-113, 1992.

"Terms of Environment: Glossary, Abbreviations, and Acronyms," U.S. Environmental Protection Agency, www.epa.gov/OCEPAterms/fterms.html, updated Oct. 2, 2006, retrieved Jan. 10, 2008.

Tetko et al., "Application of Associative Neural Networks for Prediction of Lipophilicity in ALOGPS 2.1 Program," J. Chem. Inf Comput. Sci. vol. 42, No. 5, pp. 1136-1145, 2002.

(56) References Cited

OTHER PUBLICATIONS

"The HLB System, A time-saving guide to emulsifier selection," ICI Americas Inc., 1980.
Extended European Search Report and Written Opinion, dated Apr. 26, 2011, in European Application No. 10179794.2, 9 pages.
International Search Report and Written Opinion, mailed Sep. 22, 2004, in International Application No. PCT/US2004/001684, 20 pages.
International Preliminary Report on Patentability, mailed Feb. 4, 2005, in International Application No. PCT/US2004/001684, 10 pages.
International Search Report and Written Opinion mailed Jan. 28, 2011, in International Application No. PCT/US2010/033765, 14 pages.
International Preliminary Report on Patentability mailed Nov. 17, 2011, in International Application No. PCT/US2010/033765, 9 pages.

* cited by examiner

AMINE SACRIFICIAL AGENTS AND METHODS AND PRODUCTS USING SAME

CROSS-REFERENCE TO RELATED APPLICATIONS

This application is a continuation of U.S. patent application Ser. No. 13/329,782, filed Dec. 19, 2011, which is a division of U.S. patent application Ser. No. 12/436,648, filed May 6, 2009.

BACKGROUND AND FIELD

This application relates to the use of sacrificial agents in cementitious mixtures containing ash including fly ash concrete, and to the resulting mixtures and compositions. More particularly, this application relates to sacrificial agents that reduce or eliminate the detrimental effects of ash such as fly ash on the air entrainment properties of cementitious mixtures.

The partial replacement of portland cement by fly ash is growing rapidly, driven simultaneously by more demanding performance specifications on the properties of concrete and by increasing environmental pressures to reduce portland cement consumption. Fly ash can impart many beneficial properties to concrete such as improved rheology, reduced permeability and increased later-age strength; however, it also may have a negative influence an bleed characteristics, setting time and early strength development. Many of these issues can be managed by adjusting mixture proportions and materials, and by altering concrete placement and finishing practices. However, other challenging problems encountered when using certain fly ash are not always easily resolved. The most important difficulties experienced when using fly ash are most often related to air entrainment in concrete.

Air entrained concrete has been utilized in the United States since the 1930's. Air is purposely entrained in concrete, mortars and grouts as a protective measure against expansive forces that can develop in the cement paste associated with an increase in volume resulting from water freezing and converting to ice. Adequately distributed microscopic air voids provide a means for relieving internal pressures and ensuring concrete durability and long term performance in freezing and thawing environments. Air volumes (volume fraction) sufficient to provide protective air void systems are commonly specified by Building Codes and Standard Design Practices for concrete which may be exposed to freezing and thawing environments. Entrained air is to be distinguished from entrapped air (air that may develop in concrete systems as a result of mixing or the additions of certain chemicals). Entrained air provides an air void system capable of protecting against freeze/thaw cycles, while entrapped air provide no protection against such phenomena.

Air is also often purposely entrained in concrete and other cementitious systems because of the properties it can impart to the fresh mixtures. These can include: improved fluidity, cohesiveness, improved workability and reduce bleeding.

The air void systems are generated in concrete, mortar, or paste mixtures by introducing air entrainment admixtures (referred to as air entrainment agents or air-entraining agents) which are a class of specialty surfactants. When using fly ash, the difficulties in producing air-entrained concrete are related to the disruptive influence that some fly ashes have on the generation of sufficient air volumes and adequate air void systems. The primary influencing factor is the occurrence of residual carbon, or carbonaceous materials (hereafter designated as fly ash-carbon), which can be detected as a discrete phase in the fly ash, or can be intimately bound to the fly ash particles. Detrimental effects on air entrainment by other fly ash components may also occur, and indeed air entrainment problems are sometimes encountered with fly ash containing very low amounts of residual carbon.

Fly ash-carbon, a residue of incomplete coal or other hydrocarbon combustion, is in many ways similar to an "activated carbon." For example, like activated carbon, fly ash-carbon can adsorb organic molecules in aqueous environments. In cement paste containing organic chemical admixtures, the fly ash-carbon can thus adsorb part of the admixture, interfering with the function and performance of the admixture. The consequences of this adsorption process are found to be particularly troublesome with air entrainment admixtures (air entrainment agents) which are commonly used in only very low dosages. In the presence of significant carbon contents (e.g. >2 wt %), or in the presence of low contents of highly reactive carbon or other detrimental fly ash components, the air entrainment agents may be adsorbed, interfering with the air void formation and stability; this leads to tremendous complications in consistently obtaining and maintaining specified concrete air contents.

To minimize concrete air entrainment problems, ASTM guidelines have limited the fly ash carbon content to less than 6 wt %. Other institutions such as AASHTO and state departments of transportation have more stringent limitations. Industry experience indicates that, in the case of highly active carbon (for example, high specific surface area), major interferences and problems can still be encountered, even with carbon contents lower than 1 wt %.

Furthermore, recent studies indicate that, while fly ash carbon content, as measured by loss on ignition (LOI) values, provides a primary indicator of fly ash behavior with respect to air entrainment, it does not reliably predict the impact that a fly ash will have on air entrainment in concrete. Therefore, there currently exist no means, suitable for field quality control, capable of reliably predicting the influence that a particular fly ash sample will have on air entrainment, relative to another fly ash sample with differing LOI's, sources, or chemistries. In practice, the inability to predict fly ash behavior translates into erratic concrete air contents, which is currently the most important problem in fly ash-containing concrete.

Variations in fly ash performance are important, not only because of their potential impact on air entrainment and resistance to freeze thaw conditions, but also because of their effects related to concrete strength. Just as concrete is designed according to building standards for a particular environment, specifications are also provided for physical performance requirements. A common performance requirement is compressive strength. An increase in entrained air content can result in a reduction in compressive strength of 3-6% for each additional percentage of entrained air. Obviously, variations in fly ash-carbon, which would lead to erratic variations in air contents, can have serious negative consequences on the concrete strength.

The fly ash-carbon air entrainment problem is an on-going issue that has been of concern since fly ash was first used nearly 75 years ago. Over the past ten years, these issues have been further exacerbated by regulations on environmental emissions which impose combustion conditions yielding fly ash with higher carbon contents. This situation threatens to make an increasingly larger portion of the available fly ash materials unsuitable for use in concrete. Considering the economic impact of such a trend, it is imperative to develop practical corrective schemes that will allow the use, with minimal inconvenience, of fly ash with high carbon contents (e.g., up to 10 wt %) in air-entrained concrete.

Air entrainment in fly ash-concrete may become yet more complicated by pending regulations that will require utilities to reduce current mercury (Hg) emissions by 70-90%. One of the demonstrated technologies for achieving the Hg redaction is the injection of activated carbon into the flue gas stream after combustion so that volatile Hg is condensed on the high surface area carbon particles and discarded with the fly ash. Current practices are designed such that the added activated carbon is generally less than 1% by mass of the fly ash, but preliminary testing indicates this is disastrous when using the modified fly ash in air-entrained concrete.

The origin of air entrainment problems in fly ash concrete, and potential approaches to their solution, have been the subject of numerous investigations. Most of these investigations focused on the "physical" elimination of the carbon by either combustion processes, froth floatation, or electrostatic separation. To date, the proposed fly ash treatment approaches have found limited application due to their inherent limitations (e.g., separation techniques have limited efficiency in low carbon fly ash; secondary combustion processes are most suitable for very high carbon contents), or due to their associated costs.

"Chemical" approaches have also been proposed to alleviate carbon-related problems in concrete air entrainment, for example through the development of alternative specialty surfactants for air entrainment agents such as polyoxyethylene-sorbitan oleate as an air entrainment agent (U.S. Pat. No. 4,453,978). Various other chemical additives or fly ash chemical treatments have been proposed, namely:

the addition of inorganic additives such as calcium oxide or magnesium oxide (U.S. Pat. No. 4,257,815); this patent prescribes the use of inorganic additives which may influence other properties of fresh mortars or concrete, for example, rate of slump loss and setting time;

the addition of C8 fatty acid salts (U.S. Pat. No. 5,110,362); the octanoate salt is itself a surfactant, and it is said to "stabilize the entrained air and lower the rate of air loss" (Claim 1 of U.S. Pat. No. 5,110,362);

the use of a mixture of high-polymer protein, polyvinyl alcohol and soap gel (U.S. Pat. No. 5,654,352); this discloses the use of protein and polyvinyl alcohol, and optionally a colloid (for example, bentonite) to formulate air entrainment admixtures;

treatment with ozone (U.S. Pat. No. 6,136,089); the ozone oxidizes fly ash-carbon, reducing its absorption capacity for surfactants and thus making the fly ash more suitable for use in air entrained systems.

None of these proposed solutions have found significant acceptance in the industry, either because of their complexity and cost, or because of their limited performance in actual use. For example, a clear limitation to the addition of a second surfactant (e.g., C8 fatty acid salt), to compensate for the adsorption of the air entrainment agents surfactant, simply shifts the problem to controlling air content with a combination of surfactants instead of a single one. The problem of under- or over-dosage of a surfactant mixture is then the same as the problem discussed above with conventional air entrainment agents.

Hence, a practical solution is needed for efficiently relieving air entrainment problems for a wide variety of fly ash materials and for other ashes, in ready mix facilities or in the field.

SUMMARY

The methods and compositions described herein facilitate the formation of cementitious mixtures containing fly ash and other combustion ashes, and solid products derived therefrom. Further, these methods and compositions facilitate air entrainment into such mixtures in a reliable and predictable fashion.

According to some embodiments, there is provided a method of reducing or eliminating the effect of fly ash or other combustion ashes or air-entrainment in an air-entraining cementitious mixture containing fly ash or another combustion ash, comprising the steps of: forming a cementitious mixture comprising water, cement, fly ash or another combustion ash, (and optionally other cementitious components, sand, aggregate, etc.) and an air entrainment agent (and optionally other concrete chemical admixtures); and entraining air in the mixture; wherein an amount of at least one sacrificial agent is also included in the cementitious mixture in at least an amount necessary to neutralize the detrimental effects of components of said fly ash or other combustion ash on air entrainment activity, the sacrificial agent comprising a material or mixture of materials that, when present in the same cementitious mixture without fly ash or the other combustion ash in said amount, causes less than 2 vol. % additional air content in the cementitious mixture.

The amount of the sacrificial agent used in the cementitious mixture can, in some embodiments, exceed the amount necessary to neutralize the detrimental effects of the components of the fly ash or other combustion ash. Thus, if the fly ash varies in content of the detrimental components from a minimum content to a maximum content according to the source or batch of the fly ash or other combustion ash, the amount of the at least one sacrificial agent can exceed the amount necessary to neutralize the detrimental effects of the components of the fly ash when present at their maximum content.

The sacrificial agent is a primary amine, secondary amine, or tertiary amine compound, or any combination thereof. The sacrificial agent can be a compound selected from the group consisting of the structure $NR^1R^2R^3$. $R^1$ is substituted or unsubstituted non-alkoxylated $C_{5-22}$ alkyl, substituted of unsubstituted non-alkoxylated $C_{5-22}$ alkenyl, substituted or unsubstituted non-alkoxylated $C_{5-22}$ alkynyl, substituted or unsubstituted $C_{2-22}$ alkoxylated alkyl, substituted or unsubstituted $C_{2-22}$ alkoxylated alkenyl, or substituted or unsubstituted $C_{2-22}$ alkoxylated alkynyl. $R^2$ and $R^3$ are each independently selected from hydrogen, substituted or unsubstituted $C_{1-22}$ alkyl, substituted or unsubstituted $C_{2-22}$ alkenyl, or substituted or unsubstituted $C_{2-22}$ alkynyl. $R^2$ and $R^3$ can be optionally alkoxylated. One or more of $R^1$, $R^2$, or $R^3$ can be an alkoxylated or non-alkoxylated, substituted or unsubstituted, fatty acid residue. The fatty acid residues can be saturated fatty acid residues, monounsaturated fatty acid residues, polyunsaturated fatty acid residues, or mixtures thereof. In some embodiments, one or more of $R^1$, $R^2$, and $R^3$ can be amino-substituted including $NR_4R_5$ as a substituent. For example, the sacrificial agent can be polyoxypropylenediamine or triethyleneglycol diamine. In some embodiments, the sacrificial agent is an alcoholamine. In some embodiments, the sacrificial agent is a mixture of two or more compounds. In some embodiments, the HLB value of the sacrificial agent or the mixture of sacrificial agents is in the range of 5 to 20 (e.g., 4 to 18). In some embodiments, the Log $K_{ow}$ for the sacrificial agent can be in the range of −3 to +2 (e.g. −2 to +2).

In some embodiments, the sacrificial agent is a compound selected from tridodecylamine, dodecyldimethylamine, octadecyldimethylamine, cocoalkyldimethylamine, hydrogenated tallowalkyldimethylamines, oleyldimethylamine, dicocoalkylmethylamine, N-oleyl-1,1'-iminobis-2-propanol, N-tallowalkyl-1,1'-iminobis-2-propanol, polyoxypropylenediamine, triethyleneglycol diamine, and mixtures thereof. In some embodiments, the sacrificial agent includes dodecyldimethylamine. In some embodiments, the sacrificial agent includes one or more compounds selected from N-oleyl-1,1'-iminobis-2-propanol and N-tallowalkyl-1,1'-iminobis-2-propanol. In some embodiments, the sacrificial agent includes a polyetheramine.

The dosage, or amount, of the sacrificial agent can vary from 0.005% to 5% by weight based on the weight of the fly ash or other combustion ash. In some embodiments, the amount is from 0.01 to 2%, 0.02-1% and 0.05-0.5% (e.g. 0.1-0.3%) by weight based on the weight of the fly ash or other combustion ash. The sacrificial agent can be added directly to the fly ash by pre-treating the fly ash or can be added to the cementitious composition or with other components of the cementitious composition.

Typically, the fly ash or other combustion ash is provided in the cementitious composition in an amount of from 5% to 55% by weight of the total amount of cementitious materials in the cementitious composition (cement and fly ash or other combustion ash), depending on the type and composition of the fly ash or other combustion ash. In some embodiments, the amount of fly ash or other combustion ash is from 10% to 50% or 15% to 30% by weight (e.g. 25% by weight) of the total, amount of cementitious materials in the cementitious composition.

The sacrificial agent can be mixed with the air entrainment agent prior to mixing the sacrificial agent and air entrainment agent with the fly ash or other combustion ash, cement, and water. Alternatively, the sacrificial agent can be mixed with the fly ash or other combustion ash prior to mixing the sacrificial agent and the fly ash or other combustion ash with the cement, water, and the air entrainment agent. In the latter case, the sacrificial agent can be added to the fly ash or other combustion ash by spraying a liquid containing the sacrificial agent onto the fly ash or other combustion ash, or by mixing a spray-dried solid sacrificial agent formulation with the fly ash or other combustion ash. Suitable methods are described in published U.S. Patent Application No. US 2004/0144287, which is hereby incorporated by reference in its entirety. Alternatively, the sacrificial agent can be added after the fly ash or other combustion ash, cement, water, and air entrainment agent have been mixed together. In some embodiments, an additional material selected from sand, aggregate, concrete modifier, and combinations thereof, can be incorporated into the mixture.

In some embodiments, the cementitious mixture can be formed by mixing an amount of the sacrificial agent with the fly ash or other combustion ash to form a pre-treated fly ash or other combustion ash, and then mixing the pre-treated fly ash or other combustion ash with the water, air entrainment agent and cement. In some embodiments, the cementitious mixture is formed by mixing the air entrainment agent and the sacrificial agent to form a component mixture, and then mixing the component mixture with the water, fly ash or other combustion ash and cement, and entraining the air in the mixture. In some embodiments, water, cement, fly ash or other combustion ash, air entrainment agent and sacrificial agent are mixed together simultaneously while entraining the air in the mixture. In some embodiments, the sacrificial agent is mixed with the water, cement and fly ash or other combustion ash before the air entrainment agent is added. In some embodiments, the sacrificial agent is mixed with the water, cement, and fly ash or other combustion ash at the same time as the air entrainment agent.

In some embodiments, the fly ash or other combustion ash consists essentially of fly ash. In some embodiments, the fly ash or other combustion ash comprises a blend of fly and another combustion ash. In some embodiments, the sacrificial agent, when present in the same cementitious mixture without fly ash or the other combustion ash in the appropriate amount causes less than 1 vol. % additional air content in the cementitious mixture.

In some embodiments, the method further includes the step of selecting a sacrificial agent including a material or mixture of materials to reduce or eliminate the effect of fly ash or another combustion ash on air entrainment in a cementitious mixture and selecting an amount of the sacrificial agent such that the amount is at least an amount necessary to neutralize the detrimental effects of components of the fly ash on air entrainment activity and the amount of sacrificial agent causes less than 2 vol. % additional air content in the same cementitious mixture without fly ash or the other combustion ash. In some embodiments, the fly ash or other combustion ash has a predetermined maximum carbon content and the amount of sacrificial agent exceeds the amount necessary to neutralize the maximum carbon content in the fly ash or other combustion ash. In some embodiments, the sacrificial agent amount used does not result in a substantial increase in air entrainment compared to providing the sacrificial agent in an amount necessary to neutralize the detrimental effects of components of the fly ash on air entrainment activity. In some embodiments, the sacrificial agent causes less than 2 vol. % additional air content in the cementitious mixture without fly ash. In some embodiments, the components to be neutralized are carbon content.

There is also provided a method of reducing or eliminating the effect of fly ash on air entrainment in an air-entraining cementitious mixture, comprising the steps of: forming a cementitious mixture comprising water, cement, fly ash, and an air entrainment agent, and entraining air in the mixture; wherein a sacrificial agent is also included in the cementitious mixture in at least the amount necessary to neutralize the detrimental effects of the carbon content of said fly ash on air entrainment activity, the sacrificial agent comprising a material or mixture of materials that, when present in the same cementitious mixture without fly ash in said amount causes less than 2 vol. % additional air content in the cementitious mixture.

There is further provided a method of addressing the variance of carbon content in fly ash used in cementitious compositions to provide a cementitious composition with a substantially constant level of air entrainment, comprising: forming a cementitious mixture comprising water, cement, fly ash, an air entrainment agent, and a sacrificial agent and entraining air in the mixture, wherein the fly ash has a maximum carbon content; and selecting a sacrificial agent for the cementitious mixture and an amount of the sacrificial agent such that the amount of the sacrificial agent exceeds the amount necessary to neutralize the maximum carbon contest in the fly ash, wherein the sacrificial agent comprises a material or mixture of materials that, when present in the same cementitious mixture without fly ash in said amount causes less than 2 vol. % additional air content in the cementitious mixture.

Furthermore, a method of pre-treating fly ash or another combustion ash to reduce or eliminate the effect the fly ash or the other combustion ash has on air entrainment in an air-entraining cementitious mixture comprising the fly ash or other combustible fly ash and an air-entraining agent is provided, the method comprising: mixing a sacrificial agent with fly ash or another combustion ash to form a pre-treated ash, wherein the sacrificial agent is combined with the fly ash or the other combustion ash in at least an amount necessary to neutralize the detrimental effects of components of the fly ash or the other combustion ash on air entrainment activity in the air-entraining cementitious mixture, the sacrificial agent comprising a material or mixture of materials that, when present in a cementitious mixture without fly ash or another combustion ash in said amount causes less than 2 vol. % additional air content in the cementitious mixture.

There is also provided a method of addressing the variance of carbon content in fly ash used in cementitious compositions to provide a cementitious composition with a substantially constant level of air entrainment, comprising: selecting a sacrificial agent and an amount of the sacrificial agent such that the amount of the sacrificial agent exceeds the amount necessary to neutralize the maximum carbon content in the fly ash, mixing the sacrificial agent with fly ash or another combustion ash to form a pre-treated ash, wherein the sacrificial agent is combined with the fly ash or the other combustion ash in at least an amount necessary to neutralize the detrimental effects of components of the fly ash or the other combustion ash on air entrainment activity in the air-entraining cementitious mixture, the sacrificial agent comprising a material or mixture of materials that, when present in a cementitious mixture without fly ash or another combustion ash in said amount causes less than 2 vol. % additional air content in the cementitious mixture Also provided herein is a composition comprising fly ash or another combustion ash that reduces or eliminates the effect the fly ash or the other combustion ash has on air entrainment in an air-entraining cementitious mixture comprising the fly ash or the other combustion ash and an air-entraining agent, the composition comprising fly ash or another combustion ash and a sacrificial agent, the sacrificial agent present in at least an amount necessary to neutralize the detrimental effects of components of the fly ash or the other combustion ash on air entrainment activity in the air-entraining cementitious mixture, the sacrificial agent comprising a material or mixture of materials that, when present in a cementitious mixture without fly ash or another combustion ash in said amount causes less than 2 vol. % additional air content in the cementitious mixture.

Also provided herein is a composition that addresses the variance of carbon content in fly ash or another combustion ash used in cementitious compositions to provide a cementitious composition with a substantially constant level of air entrainment, comprising fly ash or another combustion ash and a sacrificial agent, the sacrificial agent present in at least an amount necessary to neutralize the detrimental effects of components of the fly ash or the other combustion ash on air entrainment activity in the air-entraining cementitious mixture, the sacrificial agent comprising a material or mixture of materials that, when present in a cementitious mixture without fly ash or another combustion ash in said amount causes less than 2 vol. % additional air content in the cementitious mixture.

Also provided herein is an air-entraining cementitious mixture comprising fly ash or another combustion ash that reduces or eliminates the effect the fly ash or other combustion ash has on air entrainment in the air-entraining cementitious mixture; the air-entraining cementitious mixture comprising air, water, cement, fly ash, an air entrainment agent and a sacrificial agent, wherein the sacrificial agent is present in at least an amount necessary to neutralize the detrimental effects of components of the fly ash or the other combustion ash on air entrainment activity in the air-entraining cementitious mixture, the sacrificial agent comprising a material or mixture of materials that, when present in a cementitious mixture without fly ash or another combustion ash in said amount causes less than 2 vol. % additional air content in the cementitious mixture.

Further provided herein is an air-entraining cementitious mixture comprising fly ash or another combustion ash that addresses the variance of carbon content in fly ash used in cementitious compositions to provide a cementitious composition with a substantially constant level of air entrainment, the air-entraining cementitious mixture comprising air, water, cement, fly ash, an air entrainment agent and a sacrificial agent, wherein the sacrificial agent is present in at least an amount necessary to neutralize the detrimental effects of components of the fly ash or the other combustion ash on air entrainment activity in the air-entraining cementitious mixture, the sacrificial agent comprising a material or mixture of materials that, when present in a cementitious mixture without fly ash or another combustion ash in said amount causes less than 2 vol. % additional air content in the cementitious mixture, wherein the sacrificial agent is present in at least an amount necessary to neutralize the detrimental effects of components of the fly ash or the other combustion ash on air entrainment activity in the air-entraining cementitious mixture, the sacrificial agent comprising a material or mixture of materials that, when present in a cementitious mixture without fly ash or another combustion ash in said amount causes less than 2 vol. % additional air content in the cementitious mixture.

Also provided herein is an air-entrained hardened cementitious mass comprising fly ash or another combustion ash that reduces or eliminates the effect the fly ash or other combustion ash has on air entrainment in the air-entrained hardened cementitious mass, the air-entrained hardened cementitious mass comprising air, cement, fly ash, an air entrainment agent and an amount of a sacrificial agent, wherein the sacrificial agent is present in at least an amount necessary to neutralize the detrimental effects of components of the fly ash or the other combustion ash on air entrainment activity in the air-entraining cementitious mixture, the sacrificial agent comprising a material or mixture of materials that, when present in a cementitious mixture without fly ash or another combustion ash in said amount causes less than 2 vol. % additional air content in the cementitious mixture.

As described herein, the sacrificial agents can be used to eliminate or drastically reduce air entrainment problems encountered in concrete containing fly ash. Such additives, or combinations of such additives, can be added before (e.g. in the fly ash material), during, or after the concrete mixing operation. The use of these materials can have the following advantages. They:

- enable adequate levels (typically 5-8 vol. %) of gas, normally air, to be entrained in concrete or other cementitious products, with dosages of conventional air entrainment agents that are more typical of those required when no fly ash, or fly ash with low carbon content, is used;
- confer predictable air entrainment behavior onto fly ash-concrete regardless of the variability in the fly ash material, such as the source, carbon content, chemical composition;
- do not interfere with cement hydration and concrete set time;
- do not alter other physical and durability properties of concrete;
- do not significantly alter their action in the presence of other concrete chemical admixtures, for example, water reducers, superplasticizers and set accelerators; and do not cause detrimental effects when added in excessive dosages, such as excessive air contents, extended set times, or strength reduction.

The acceptability of "overdosage" of these sacrificial agents is advantageous in some embodiments, since large fluctuations in fly ash properties (carbon content, reactivity, etc.) can be accommodated by introducing a moderate excess of these sacrificial agents without causing other problems. This provides operators with a substantial trouble-free range or comfort zone.

The cementitious mixtures can contain conventional ingredients such as sand and aggregate, as well as specific known additives.

DEFINITIONS

The term "fly ash", as defined by ASTM C 618 (Coal Fly Ash or Calcined Natural Pozzolan For Use in Concrete) refers to a by product of coal combustion. However, other combustion ashes can be employed which are fine ashes or flue dusts resulting from co-firing various fuels with coal, or resulting from the combustion of other fuels that produce an ash having pozzolanic qualities (the ability to form a solid when mixed with water and an activator such ash lime or alkalis) or hydraulic qualities (the ability to form a solid when mixed with water and set). The ash itself has pozzolanic/hydraulic activity and can be used as a cementitious material to replace a portion of portland cement in the preparation of concrete, mortars, and the like. The term "fly ash and other combustion ash" as used herein includes:

1) Ash produced by co-firing fuels including industrial gases, petroleum coke, petroleum products, municipal solid waste, paper sludge, wood, sawdust, refuse derived fuels, switchgrass or other biomass material, either alone or in combination with coal.
2) Coal ash and/or alternative fuel ash plus inorganic process additions such as soda ash or trona (native sodium carbonate/bicarbonate used by utilities).
3) Coal ash and/or alternative fuel ash plus organic process additives such as activated carbon, or other carbonaceous materials, for mercury emission control.
4) Coal ash and/or alternative fuel ash plus combustion additives such as borax.
5) Coal ash and/or alternative fuel gases plus flue gas or fly ash conditioning agents such as ammonia, sulfur trioxide, phosphoric acid, etc.

The term "fly ash concrete" means concrete containing fly ash and portland cement in any proportions, but optionally additionally containing other cementitious materials such as blast furnace slag, silica fume, or fillers such as limestone, etc.

The term "surfactants" is also well understood in the art to mean surface active agents. These are compounds that have an affinity for both fats (hydrophobic) and water (hydrophilic) and so act as foaming agents (although some surfactants are non-foaming, e.g. phosphates), dispersants, emulsifiers, and the like, e.g. soaps.

The term "air entrainment agent" (AEA) means a material that results in a satisfactory amount of air being entrained into a cementitious mixture, e.g. 5-9 vol % air, when added to a cementitious formulation. Generally, air entrainment agents are surfactants (i.e. they reduce the surface tension when added to aqueous mixtures), and are often materials considered to be soaps.

The mode of action of air entrainment agents, and the mechanism of air void formation in cementitious mixtures are only poorly understood. Because of their influence on the surface tension of the solution phase, the surfactant molecules are believed to facilitate the formation of small air cavities or voids in the cementitious paste, by analogy to formation of air 'bubbles'. It is also believed that the wall of these voids are further stabilized through various effects, such as incorporation into the interfacial paste/air layer of insoluble calcium salts of the surfactants, or of colloidal particles.

The performance of surfactants as concrete air entrainment admixture depends on the composition of the surfactant; the type of hydrophilic group (cationic, anionic, zwitterionic, or non-ionic), the importance of its hydrophobic residue (number of carbon groups, molecular weight), the chemical nature of this residue (aliphatic, aromatic) and the structure of the residue (linear, branched, cyclic), and on the balance between the hydrophilic and lipophilic portions of the surfactant molecule (HLB). Cationic and non-ionic surfactants are reported to entrain more air than anionic surfactants because the latter are often precipitated as insoluble calcium salts in the paste solution; however, the stability of the air void has also been reported to be greater with anionic surfactant than with cationic or non-ionic surfactants. Typical examples of compounds used as surface active agents are sodium salts of naturally occurring fatty acid such as tall oil fatty acid, and sodium salts of synthetic n-alkylbenzene sulfonic acid. Common concrete air entrainment (or air-entraining) agents include those derived from the following anionic surfactants: neutralized wood resins, fatty acids salts, alkyl-aryl sulfonates, and alkyl sulfates.

The term "sacrificial agent" (SA) means a material, or a mixture of materials, that interacts with (and/or neutralizes the detrimental effects of) components of fly ash that would otherwise interact with an air entrainment agent and reduce the effectiveness of the air entrainment agent to incorporate air (or other gas) into the cementitious mixture. The sacrificial agents are not "air entrainment agents" as they are understood in the art and, in the amounts used in the cementitious mixture, do not cause more than 2 vol % additional air content (or even less than 1 vol % additional air content) into the same mixture containing no fly ash. In some embodiments, the sacrificial agent, in the amounts employed in fly ash-containing mixtures, is responsible for introducing less than 0.5 vol % or even substantially no additional air content into the same mixture containing no fly ash. In some embodiments, the sacrificial agent neither promotes nor inhibits the functioning of the air entrainment agent compared with its functioning in a similar mixture containing no fly ash.

The term "cementitious mixture" means a mixture such as concrete mix, mortar, paste, grout, etc., that is still in castable form and that, upon setting, develops into a hardened mass suitable for building and construction purposes. Likewise, the term "cement" means a product (other than fly ash) that is capable of acting as the principal hardenable ingredient in a cementitious mixture. In some embodiments, the cement is portland cement, but at least a portion can include blast furnace slag, gypsum, and the like.

The term "percent" or "%" as used herein in connection with a component of a composition means percent by weight based on the cementitious components (cement and fly ash) of a cementitious mixture (unless otherwise stated). When referring to air content, the term % means percent by volume or vol %.

The terms "alkyl", "alkenyl", and "alkynyl" as used herein can include straight-chain and branched monovalent substituents. Examples include methyl, ethyl, isobutyl, 2-propenyl, 3-butynyl and the like.

The term, "substituted" as used herein indicates the main substituent has attached to it one or more additional components, such as, tor example, amino, hydroxyl, carbonyl, or halogen groups. The term "unsubstituted" indicates that the main substituent has a full compliment of hydrogens, i.e., commensurate with its saturation level, with no substitutions, e.g., linear decane (—$(CH_2)_9$—$CH_3$).

The term "alkoxylated" as used herein is an adjective referring to a compound having an "alkoxyl" linkage having the formula —$(OR)_n$— wherein R can be an alkyl, alkenyl, or alkynyl group. Examples of suitable "R" groups include ethyl (ethoxylate), propyl (propoxylate), or butyl (butoxylate) groups. The value for n is an average value and can vary for the sacrificial agent (where alkoxylation is present) from 1 to 10, 1.5 to 9 or 2 to 8.

| ABBREVIATIONS | |
|---|---|
| Fly Ash | FA |
| Portland cement A | PCA |
| Portland cement C | PCC |
| Sacrificial agent | SA |
| Air entrainment agents or admixtures | AEA |
| Relative to cementitious materials (CM) | wt % |
| Amount of air entrained | vol % |
| Average of Air Entrained | Aver (%) |
| Relative Standard Deviation | RSD (%) |
| HLB | Hydrophilic Lipophilic Balance |
| $K_{ow}$ | Ratio of solubility in oil (octanol) and in water |
| Log$K_{ow}$ | Logarithm of $K_{ow}$ |
| LOI | Loss on ignition |

DETAILED DESCRIPTION

Figure 1:
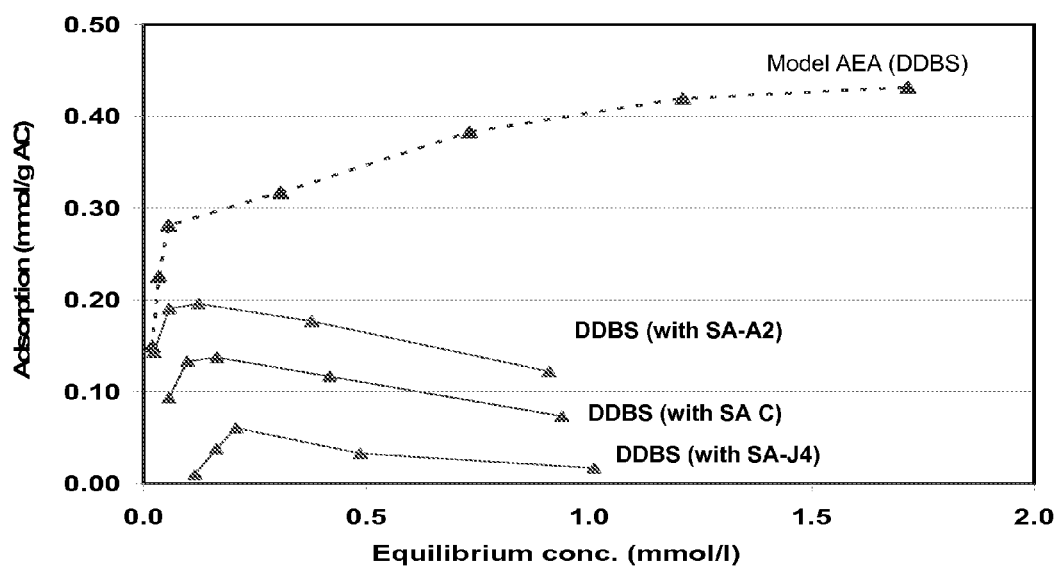
FIG. 1 is a graph illustrating competitive absorption by activated carbon with various sacrificial agents at saturated concentrations.

In the following description, reference is made to air entrainment in concrete and cementitious mixtures. It will be realized by persons skilled in the art that other inert gases, such as nitrogen, that act in the same way as air, can be entrained in concrete and cementitious mixtures. The use of air rather than other gases is naturally most frequently carried out for reasons of simplicity and economy. Techniques for entraining air in cementitious mixtures using air-entraining agents are well known to persons skilled in the art. Generally, when an air entrainment agent is used, sufficient air is entrained when the ingredients of the mixture are simply mixed together and agitated in conventional ways, such as stirring or tumbling sufficient to cause thorough mixing of the ingredients.

As noted earlier, air entrainment problems in fly ash concrete have been traced to undesirable components contained in the fly ash materials, particularly residual carbon. These fly ash components can adsorb and/or react or interact with the air entrainment agent (surface active compounds, e.g. soaps) used for entrainment air in concrete, thereby neutralizing or diminishing the functionality of such agents and consequently reducing the uptake of air. Up to the present, the industrial approach to dealing with these air entrainment problems consisted in adding higher dosages of the air entrainment agents in order to overwhelm the deleterious processes. Because the quantities of detrimental components in fly ash can vary greatly among fly ashes from different sources, or for a fly ash from any particular source at different times, the current practices lead to other complications, namely in assessing the adequate dosage of air entrainment agents to achieve a specified air content, in maintaining the specified air content over adequate time periods, in guarding against excessive entrained air contents that would detrimentally impact concrete strength and durability, in obtaining specified air void parameters, etc. In particular, the fact that excessive dosages of the air entrainment agent can result in excess air entrainment and subsequent reduction in concrete compressive strength, is particularly serious and a major disadvantage of the prior approach.

The issues with the components of fly ash and other combustion ash and the effects of these components on air entrainment are further complicated by the addition of activated carbon to fly ash and other combustion ashes. Specifically, mercury (Hg) is present as a trace element in coal that becomes a contaminant in fly ash from coal-fired power plants and other coal fired furnaces. As a result, processes have been developed to capture Hg contained in fly ash. For example, one process that has been developed injects activated carbon in fly ash to absorb Hg. Unfortunately, activated carbon is expensive and thus its use for Hg removal adds significantly to overall costs. Fly ash without activated carbon may be used as a partial replacement for portland cement in concrete if it meets certain specifications (such as those found in ASTM C618-05 "Standard Specification for Coal Fly Ash and Raw or Calcined Natural Pozzolan for Use in Concrete"). The most common reason fly ash without activated carbon cannot be used in concrete is excess unburned carbon content in the ash. Excess unburned carbon is not allowed because it absorbs additives used in concrete making and makes them ineffective. However, after addition of activated carbon for Hg capture, ash is generally unusable even if it meets the unburned carbon specifications. This is because the activated carbon absorbs the concrete additives to a much large degree than the unburned carbon normally found in fly ash. Therefore, adding activated carbon to fly ash to capture Hg requires additional thermal beneficiation to make the resulting fly ash usable. The inventors have found that adding an amine sacrificial agent can make fly ash concrete including activated carbon useful without employing the expensive treatment methods associated with activated carbon.

To address the above problems, an amine sacrificial agent is used to neutralize or eliminate the effect of the harmful components of fly ash on the air entrainment agent. Typically, the sacrificial agent acts preferentially (i.e. when present at the same time as the air entrainment agent, or even after the contact of the air entrainment agent with the fly ash, the sacrificial agent interacts with the fly ash), does not itself entrain air in significant amounts, and does not harm the setting action or properties of the cementitious material in the amounts employed. The inventors have now found certain amines capable of "neutralizing" the detrimental fly ash components, while having little or no influence on the air entrainment process provided by conventional air entrainment agents and having no adverse effects on the properties of the concrete mix and hardened concrete product. These amine sacrificial agents, introduced into the mixture at an appropriate time, render fly ash concrete comparable to normal concrete with respect to air entrainment. The finding of economically viable chemical additives of this type, as well as practical processes for their introduction into concrete systems, constitutes a major advantage for fly ash concrete technologies.

It has been found that primary, secondary, and tertiary non-aromatic amines are the most suitable as sacrificial agents, namely compounds selected from the group consisting of the structure $NR^1R^2R^3$, wherein $R^1$ is substituted or unsubstituted non-alkoxylated $C_{5-22}$ alkyl, substituted or unsubstituted non-alkoxylated $C_{5-22}$ alkenyl, substituted or unsubstituted non-alkoxylated $C_{5-22}$ alkynyl, substituted or unsubstituted $C_{2-22}$ alkoxylated alkyl, substituted or unsubstituted $C_{2-22}$ alkoxylated alkenyl, or substituted or unsubstituted $C_{2-22}$ alkoxylated alkynyl, $R^2$ and $R^3$ are each independently selected from hydrogen, substituted or unsubstituted $C_{1-22}$ alkyl, substituted or unsubstituted $C_{2-22}$ alkenyl, or substituted or unsubstituted $C_{2-22}$ alkynyl. In some embodiments, the Log $K_{ow}$ is in the range of −3 to +2 (e.g., −2 to +2) and/or the HLB value is in the range of 5 to 20 (e.g., 4 to 18). The alkyl, alkenyl or alkynyl chains can be branched or straight chains. $R^2$ and $R^3$ can be optionally alkoxylated. The $R^1$, $R^2$ and $R^3$ can be substituted with groups such as halogen, carbonyl, hydroxyl, amine, and the like. In some embodiments, these compounds are used in pure or substantially pore form.

In some embodiments, one or more of $R^1$, $R^2$, and $R^3$ is independently an alkoxylated or non-alkoxylated, substituted or unsubstituted fatty acid residue. In some embodiments, $R^1$, $R^2$, and $R^3$ can be selected from the group consisting of saturated fatty acids, monounsaturated fatty acids, polyunsaturated fatty acids, and mixtures thereof.

In some embodiments, $R^1$ is a higher alkyl, alkenyl or alkynyl group having 7 or more carbon atoms (e.g, C8-C25 or C10-C20) and is generally an alkyl or alkenyl group. The $R^2$ and $R^3$ groups can also be a higher alkyl, alkenyl or alkynyl group although, in some embodiments, are lower alkyl, alkenyl or alkenyl groups (e.g. C1-C5) such as C1-C3 alkyl or hydrogen. Exemplary compounds include tridodecylamine, dodecyldimethylamine, octadecyldimethylamine, cocoalkyldimethylamines, hydrogenated tallowalkyldimethylamines, oleyldimethylamine, dicocoalkylmethylamine, and mixtures thereof. The compounds can also be polyetheramines including the groups for $R^1$, $R^2$ and $R^3$ described above and further being alkoxylated to the levels described herein.

In some embodiments, one or more of $R^1$, $R^2$, and $R^3$ is independently amino-substituted (e.g. with a $NR^4R^5$ group where $R^4$ and $R^5$ are H or substituted or unsubstituted, alkoxylated or non-alkoxylated, alkyl, alkenyl or alkynyl groups). For example, the amine sacrificial agent can be a diamine compound wherein $R^1$ is amino-substituted. Exemplary diamines include polyetherdiamines (such as polyoxypropylenediamines and polyoxyethylene diamines) wherein the average level of alkoxylation is from 1 to 10, from 1.5 to 9 or from 2 to 8. Suitable alkoxylated diamines can have the formula $NH_2-R-(R^1O)_x-NH_2$ wherein R is C1-C5 alkyl, $R^1$ is C2-C4 alkyl, and x is the level of alkoxylation. For example, polyoxypropylenediamines are commercially available as Jeffamine D 400 and Jeffamine D 230; and triethyleneglycol diamine is commercially available as Jeffamine EDR 148, all from Huntsman International LLC. In some embodiments, the diamines are non-alkoxylated wherein x is 0 and R can be C5 or greater (e.g. C8-C25 or C10-C20). In some embodiments, the diamines are alkoxylated and have the formula $R^3((R^4O)_wH)N-R^2-N((R^5O)_yH)((R^6O)_zH)$ wherein $R^2$ is C1-C5 alkyl, $R^3$ is C1-C25 alkyl, alkenyl or alkynyl, $R^4$, $R^5$ and $R^6$ are independently C2-C4 alkyl, one or more of x, y and z is greater than 0, and the total level of alkoxylation (w+y+z) is 1 to 10, 1.5 to 9 or 2 to 8. In some embodiments, $R^3$ is C5-C25 alkyl, alkenyl, or alkynyl (e.g. C8-C25 or C10-C20 alkyl). Exemplary alkoxylated diamines include N-oleyl-1,1'-iminobis-2-propanol and N-tallowalkyl-1,1'-iminobis-2-propanol. One commercially available example is N-tallowalkyl-1,1'-iminobis-2-propanol available from Akzo Nobel as Ethoduomeen T/13N. In some embodiments, the diamines can be non-alkoxylated (w+y+z)=0 and $R^2$ can be C5 or greater (e.g. C8-C25 or C10-C20).

In some embodiments, the amine is hydroxyl substituted (e.g. at one, two or three of $R^1$, $R^2$ and $R^3$) and is an alcoholamine. In some embodiments, $R^1$ is higher alkyl as described above and can be optionally substituted with a carbonyl group and one or more of $R^2$ and $R^3$ are hydroxyl substituted. For example, Amadol 1017 commercially available from Akzo Nobel and having the formula $CH_3(CH_2)_{10}C(=O)N(CH_2CH_2OH)_2$ can be used. Alternatively, $R^1$ and one or more of $R^2$ and $R^3$ can be hydroxyl substituted.

In some embodiments, the amine sacrificial agent has a particular "Hydrophilic Lipophilic Balance" (HLB) rating, or oil/water (or octanol/water) partition coefficients ($K_{OW}$). These terms are understood in the art and are described, for example, in U.S. Pat. No. 7,485,184, which is hereby incorporated by reference in its entirety. In some embodiments, the HLB value of the sacrificial agent or the mixture of sacrificial agents is in the range of 5 to 20 (e.g., 4 to 18). In some embodiments, the Log Kow for the sacrificial agent can be in the range of −3 to +2 (e.g. −1 to +2).

Combinations of these amine sacrificial agents can be used as the sacrificial agent composition. For example, in some embodiments, dodecyldimethylamine, polyoxypropylenediamine, triethyleneglycol diamine, and mixtures thereof are used as the sacrificial agent. In some embodiments, the sacrificial agent can two or more amine sacrificial agents in weight a ratio of 1:1-1:50 wherein the total sacrificial agent is as described herein. For example, the sacrificial agent can include a first component having a compound A from the group of tridodecylamine, dodecyldimethylamine, octadecyldimethylamine, cocoalkyldimethylamines, hydrogenated tallowalkyldimethylamines, oleyldimethylamine, dicocoalkylmethylamine, and mixtures thereof (e.g. dodecyldimethylamine), and a second compound B from the group of polyetheramines, diamines, alcoholamines, all as described above, and mixtures thereof (e.g. polyoxypropylenediamine), wherein the weight ratio of compound A to compound B is 2:1 to 1:50, 1.25:1 to 1:25, or 1:1 to 1:5. In some eases, it can be advantageous to mix a sacrificial agent having different HLB values (e.g. high and low values) to produce a combined sacrificial agent mixture that is approximately neutral in its effect on the entrainment of air in the mixture. In this way, it is possible to use highly active sacrificial agents that would otherwise interfere too much with the entrainment of air.

In some embodiments, the amounts of such sacrificial agents are sufficient to neutralize the harmful components of the fly ash that adsorb or react with the air entrainment agents. The required minimum dosage can be determined experimentally through air entrainment protocols since, as discussed earlier and shown below, the deleterious effects of fly ash components are not necessarily directly related to their carbon content or LOI. In some embodiments, the sacrificial agents can be used in reasonable excess over the neutralizing amounts without entrainment of excess air (or reduction of such entrainment) or harming the concrete mixture or the subsequent setting action or properties of the hardened concrete. This means that an amount can be determined which exceeds the neutralizing amount required for a fly ash containing the highest amount of the harmful components likely to be encountered, and this amount can then be safely used with any fly ash cement mixture.

The amine sacrificial agents can be used in combination with one or more sacrificial agents described in U.S. Pat. No. 7,435,184, which is incorporated by reference herein in its entirety. For example, additional sacrificial agents can include sodium naphthoate, sodium naphthalene sulfonate, sodium diisopropyl naphthalene sulfonate, sodium cumene sulfonate, sodium dibutyl naphthalene sulfonate, ethylene glycol phenyl ether, ethylene glycol methyl ether, butoxyethanol, diethylene glycol butyl ether, dipropylene glycol methyl ether, polyethylene glycol and phenyl propylene glycol and combinations thereof. In addition, In some embodiments, sodium diisopropyl naphthalene sulfonate is included with the amine sacrificial agent in the sacrificial agent composition. The additional sacrificial agent can be included at a weight ratio of non-amine sacrificial agent to amine sacrificial agent of 1:2 to 1:150, or 1:5 to 1:100, or 1:10 to 1:75.

In some embodiments, the amine sacrificial agents can be used in combination with a water reducer. For example, lignosulfonates and polynaphthalene sulfonates have been found to particularly enhance the properties of the amine sacrificial agents. The water reducer can be included in a weight ratio of water reducer to amine sacrificial agent of 40:1 to 1:1.25 or 15:1 to 2:1.

The sacrificial agents can be added at any time during the preparation of the concrete mix. In some embodiments, they are added before or at the same time as the air entrainment agents so that they can interact with the fly ash before the air entrainment agents have an opportunity to do so. The mixing in this way can be carried out at ambient temperature, or at elevated or reduced temperatures if such temperatures are otherwise required for particular concrete mixes. The sacrificial agents can also be premixed with the fly ash or with the air entrainment agent.

It is particularly convenient to premix the sacrificial agent with the fly ash because the sacrificial agent can commence the interaction with the harmful components of the fly ash even before the cementitious mixture is formed. The sacrificial agent can simply be sprayed or otherwise added in liquid form onto a conventional fly ash and left to be absorbed by the fly ash and thus to dry. If necessary, the sacrificial agent can be dissolved in a volatile solvent to facilitate the spraying procedure. Fly ash treated in this way can be prepared and sold as an ingredient for forming fly ash cement and fly ash concrete.

Surprisingly, it has also been found that the sacrificial agent is even effective when added after the mixing of the other components of the cementitious mixture (including the air entrainment agent). Although not wishing to be bound by a particular theory, it appears that the sacrificial agent can reverse any preliminary deactivation of the air entrainment agent caused by contact with the fly ash, and thus reactivate the air entrainment agent for further air entrainment. It is observed, however, that the beneficial effect of the sacrificial agents is somewhat lower when added at this stage rather than when added before or during the mixing of the other components.

As noted above, in some embodiments, the chemical additives used as sacrificial agents are not effective air entrainment agents in the amounts employed, so that they do not contribute directly to air entrainment and can thus also be used in normal concrete containing no fly ash. This confers on the sacrificial agents the particularly important feature that these sacrificial agents can be introduced at dosages higher than the minimum dosage required to restore normal air entrainment without leading to erratic air entrainment and excessive air entrained levels. If one of the sacrificial agents used in a combination of sacrificial agents exhibits some surfactant (air entrainment) properties, it can be proportioned in such a way that the combination of sacrificial agents will entrain less than 2% air (or less than 1% air, or substantially no air), above the control values, in normal concrete without any fly ash. That is to say, when a concrete formulation is produced without fly ash, but with an air entrainment agent, the extra amount of air entrained when a sacrificial agent is added represents the extra air entrained by the sacrificial agent. The amount of air entrained in a cementitious mixture can be measured by determination of specific gravity of the mixture, or other methods prescribed in ASTM procedures (ASTM C231, C173, and C138—the most recent disclosures of which are incorporated herein by reference in their entirety).

Typical concrete air entrainment agents are n-dodecylbenzene sulfonate salts (referred to as Air 30) and tall oil fatty acid salts (referred to as Air 40). The typical dosage range of these ingredients in portland cement concrete mixes is 0.002 to 0.008 wt % of the cementitious components. The targeted air entrainment for the cementitious composition is typically 6-8 vol % air.

Other components of the cementitious mixtures are water, cement and fly ash. These can be used in proportions that depend on the type of material desired (e.g., pastes, grouts, mortars, concrete) and on the required fresh and hardened properties of the finished material. Such systems and their composition, as well as equipment and protocols for their preparation, are well known in the art; for mortars and concrete, these are adequately described in standard reference texts, such as ASTM Cement and Concrete (e.g., 4.01, 4.02); Design, and Control of Concrete Mixtures—Portland Cement Association; and American Concrete Institute—Manual of Concrete Practice (the disclosures of which are incorporated herein by reference). For pastes, the composition and preparation equipment and protocols will be described in detail in following sections. In practice, the content of various ingredients in a cementitious mixture are often reported as weight ratios with respect to the cement or to the total cementitious materials when other cementitious materials such as fly ash, slag, etc., are present. These ratios are well known to persons skilled in the art.

Once formed, the cementitious mixture can be used in any conventional way, e.g. poured into a form and allowed to harden and set. The hardened product will contain fly ash and entrained air, but no excess of air entrainment agent that could adversely affect the air content and properties of the hardened product.

The cementitious mixtures can include other standard or specialized concrete ingredients known to persons skilled in the art.

The following examples are provided to more fully illustrate some of the embodiments of the present invention. It should be appreciated by those of skill in the art that the techniques disclosed in the examples which follow represent techniques discovered by the inventors to function well in the practice of the invention, and thus can be considered to constitute exemplary modes for its practice. However, those of skill is the art should, in light of the present disclosure, appreciate that many changes can be made in the specific embodiments that are disclosed and still obtain a like or similar result without departing from the spirit and scope of the invention. Parts and percentages are provided on a per weight basis except as otherwise indicated.

EXAMPLES

Example 1

PACT Formulation

A sacrificial agent formulation (PACT) is prepared by mixing polyoxypropylenediamine, dodecyldimethylamine, and optionally sodium diisopropylnapthalenesulfonate. For the following examples, PACT was formulated as follows: 0.05% dodecyldimethylamine and 0.15% polyoxypropylenediamine, by weight of fly ash.

Composition Preparation

To prepare the composition, the aggregate is mixed with partial water followed by the portland cement. Fly ash combined with activated carbon is then added followed by the PACT formulation and the air entrainment agent. Alternatively, the PACT foundation can be added directly to the fly ash. Additional water is added to obtain a 4-6 inch slump. The composition is then mixed using a rotary mixer, and tested for volume percentage of air using a pressure meter according to the ASTM C 231 method.

Activated carbon for the following examples was obtained from three sources:
PAC-A: Norit HgLH (Norit Americas Inc., Marshall, Tex.)
PAC-B: ADA-ES (ADA Environmental Solutions, Littleton, Co.)
PAC-C: Calgon MC Plus (Calgon Carbon, Pittsburgh, Pa.).

The air entrainment agent used in the following examples was MB-AE 90 (BASF Construction Chemicals, Shakopee, Minn.) and is labeled as AEA-1.

Example 2

The competitive absorption by PAC-C with various sacrificial agents at saturated concentrations was determined (FIG. 1). The Once labeled Model AEA (DDBS) displays the absorption of an air entrainment agent (dodecylbenzenesulfonate (DDBS)) by MC activated carbon without the presence of a sacrificial agent. The trace labeled DDBS (with SA-A2) displays the absorption of DDBS by PAC-C and Jeffamine EDR-148. The trace labeled DDBS (with SA-C) displays the absorption of DDBS by MC activated carbon and Jeffamine 230. The trace labeled DDBS (with SA-J4) displays the absorption of DDBS by MC activated carbon and Jeffamine 400.

Example 3

Figure 2:
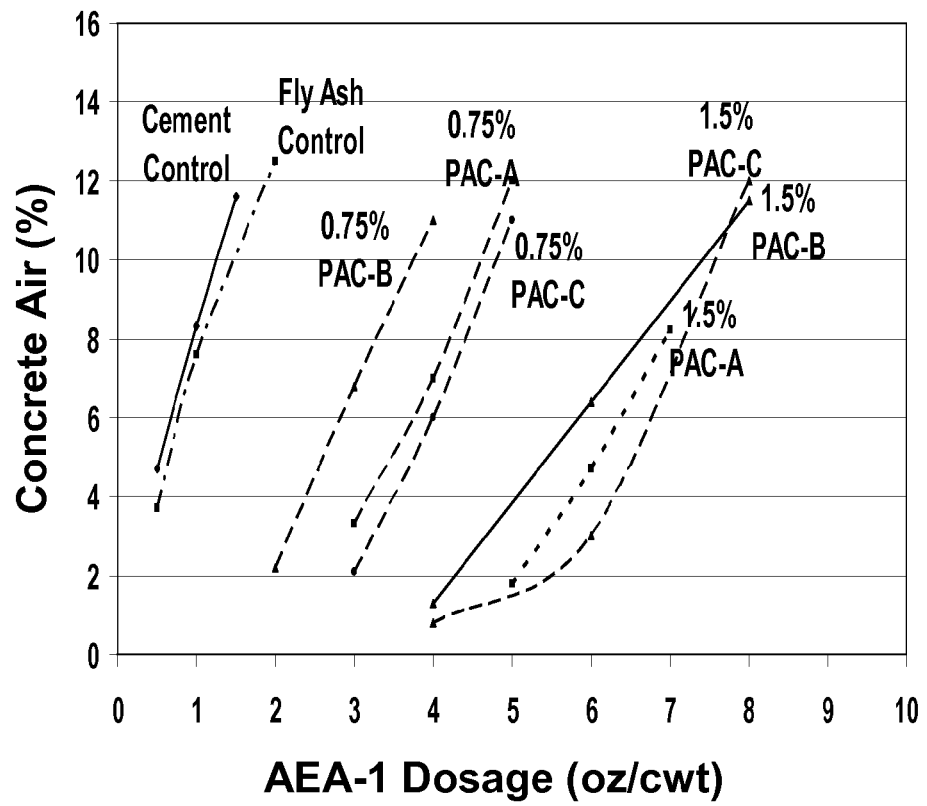
FIG. 2 is a graph illustrating the percentage of air in concrete with increasing concentrations of an air entrainment agent with various activated carbon samples at varying amounts.

The percentage of air in concrete with increasing concentrations of air entraining agent AEA-1 with varying amounts of activated carbon samples PAC-A, PAC-B, and PAC-C was determined. The amounts tested for each activated carbon sample include 0.75% and 1.5% (FIG. 2). Cement and fly ash cement independently served as controls. All activated carbon samples increased the air entraining agent demand.

Example 4

Figure 3:
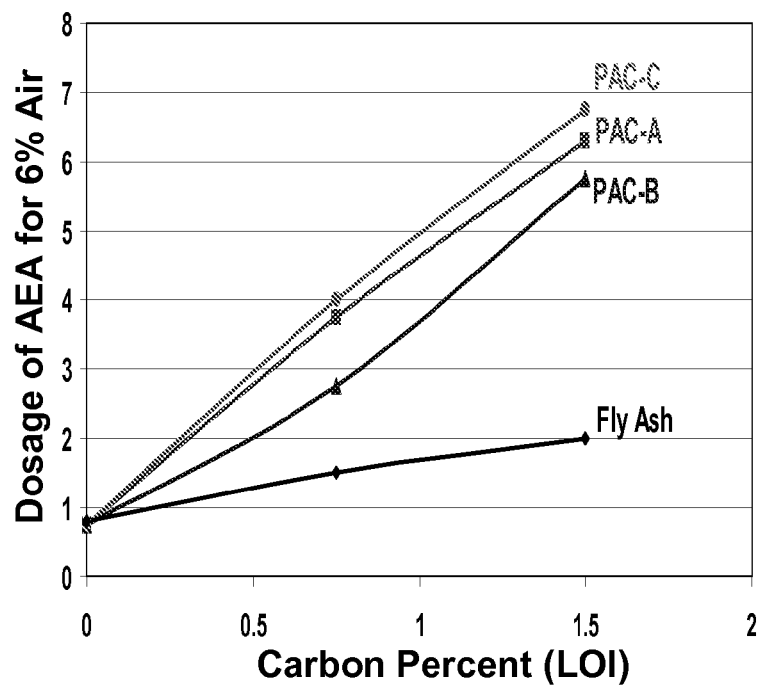
FIG. 3 is a graph illustrating the dosage of an air entrainment agent at 6% air in concrete with increasing amounts of carbon contents.

The dosage of an air entrainment agent for 6% air in concrete with increasing amounts of carbon content with activated carbon samples PAC-A, PAC-B, and PAC-C was determined (FIG. 3). Fly ash served as the control.

Example 5

Figure 4:
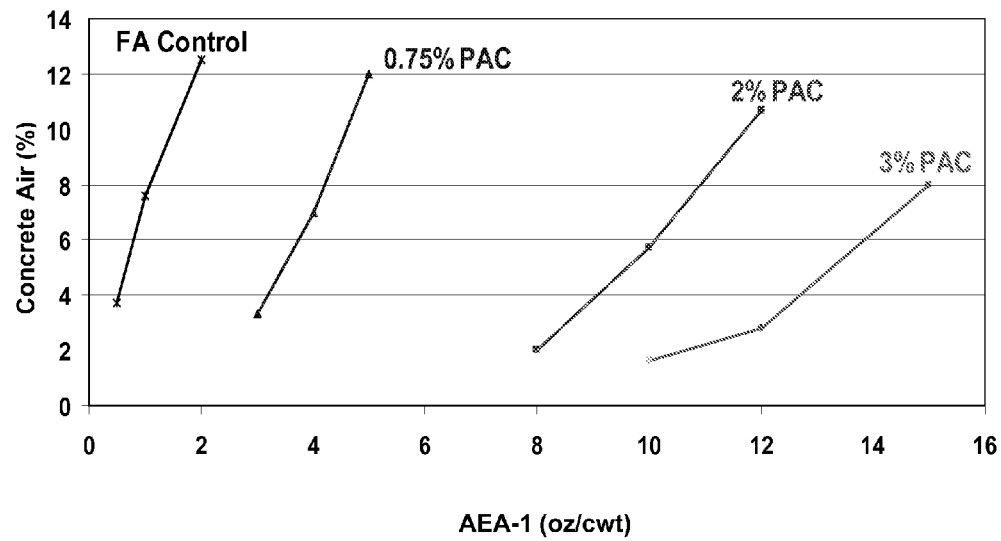
FIG. 4 is a graph illustrating the percentage of air in concrete with increasing concentrations of an air entrainment agent with various amounts of activated carbon.

The percentage of air in concrete with increasing concentrations of an air entrainment agent (AEA-1) with varying amounts of activated carbon (PAC-A) was determined (FIG. 4). Fly ash served as the control. The presence of activated carbon caused the air entraining admixture demand to reach unacceptable levels.

Example 6

Figure 5:
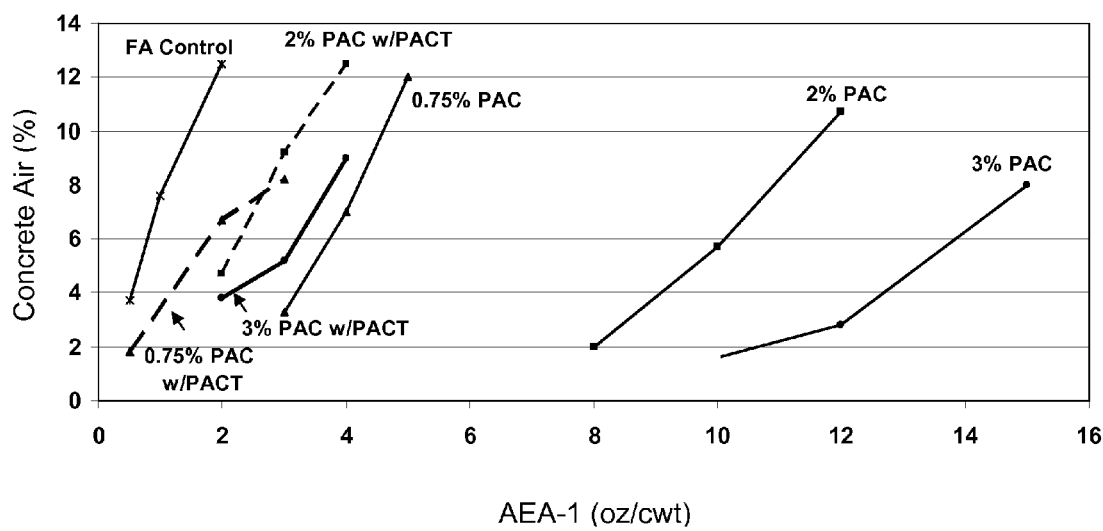
FIG. 5 is a graph illustrating the percentage of air in concrete with increasing concentrations of an air entrainment agent with sacrificial agents and activated carbon.

The percentage of air in concrete with increasing concentrations of an air entrainment agent (AEA-1) with varying amounts of activated carbon (PAC-A) with and without PACT (as formed in Example 1) was determined (FIG. 5). The amounts tested include 0.75% PAC, 2% PAC, 3% PAC, 0.75% PAC with PACT, 2% PAC with PACT, and 3% PAC with PACT. Fly ash served as the control. The inclusion of PACT in the activated carbon formulations reduced the air entraining admixture demand to acceptable levels.

Example 7

Figure 6:
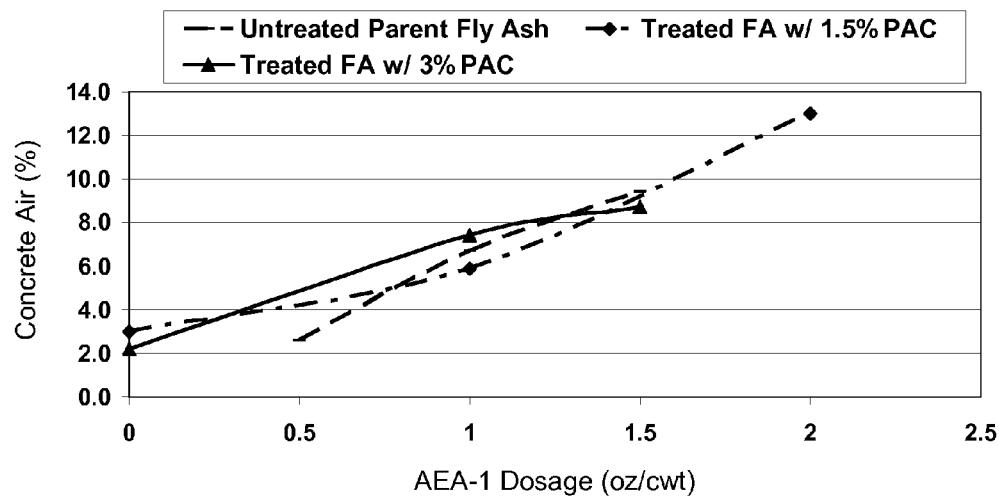
FIG. 6 is a graph illustrating the percentage of air in concrete with increasing concentrations of an air entrainment agent with sacrificial agent-treated fly ash combined with activated carbon.

The percentage of air in concrete with increasing concentrations of an air entrainment agent (AEA-1) with fly ash treated with activated carbon (PAC-A) in the presence of PACT was determined (FIG. 6). The amounts tested included fly ash treated with 1.5% activated carbon and fly ash treated with 3% activated carbon. The PACT was present in constant, high dosage. Untreated fly ash served as the control. Increasing the dosage of PACT resulted in a performance comparable to that of untreated fly ash.

Example 8

Figure 7:
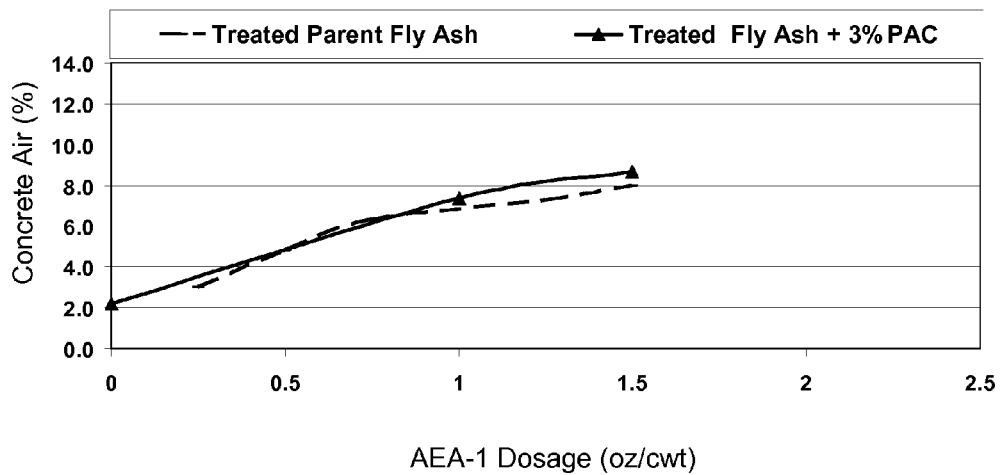
FIG. 7 is a graph illustrating the percentage of air in concrete with increasing concentrations of an air entrainment agent with sacrificial agent-treated fly ash with and without activated carbon.

The percentage of air in concrete with increasing concentrations of an air entrainment agent (AEA-4) with PACT treated fly ash in the presence and absence of 3% activated carbon (PAC-A) was determined (FIG. 7). Both the PACT treated fly ash that contained activated carbon and the PACT treated fly ash that did not contain activated carbon displayed similar entraining properties.

Example 9

Figure 8:
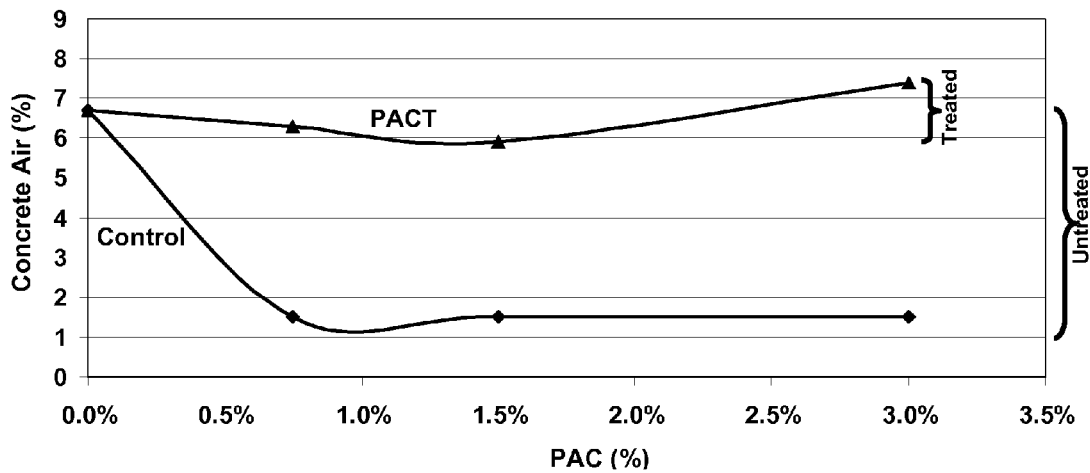
FIG. 8 is a graph illustrating the percentage of air in concrete with increasing percentages of activated carbon in the presence of an air entrainment agent and with and without sacrificial agents.

The percentage of air in concrete with varying amounts of activated carbon (PAC-A) with a constant concentration (1 oz/cwt) of an air entrainment agent (AEA-1) was determined (FIG. 8). The air entrainment agent was treated with PACT. Untreated AEA-1 served as the control. PACT treatment was shown to minimize air fluctuations over a broad range of PAC contamination levels.

Example 10

Figure 9:
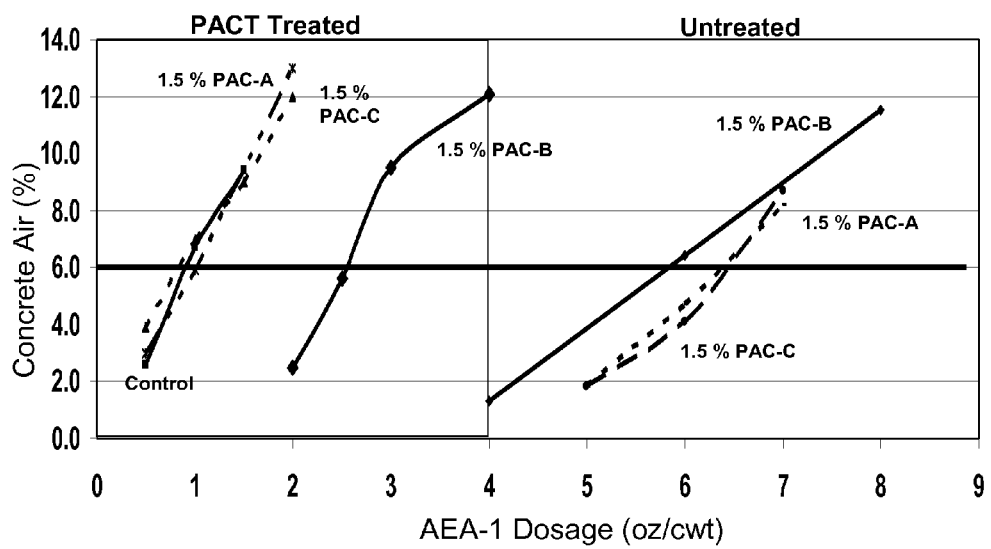
FIG. 9 is a graph illustrating the percentage of air in concrete with increasing concentrations of an air entrainment agent with and without sacrificial agents.

The percentage of air in concrete with increasing concentrations of air entrainment agent (AEA-1) was determined for untreated activated carbon and activated carbon treated with PACT (FIG. 9). The activated carbon samples were obtained from three different sources (PAC-A, PAC-B, and PAC-C). PACT was effective for all of the PAC samples tested; however, in some cases, it may be better to adjust the formulation depending upon the PAC source.

Example 11

Figure 10:
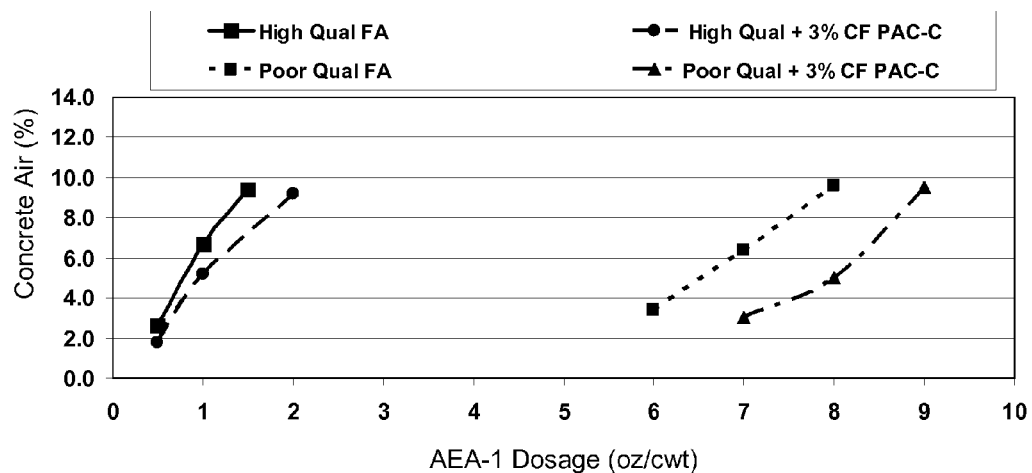
FIG. 10 is a graph illustrating the percentage of air in concrete with increasing concentrations of an air entrainment agent with concrete friendly activated carbon and varying quality fly ash samples.

The percentage of air in concrete with increasing concentrations of air entrainment agent (AEA-1) was determined for high quality fly ash having a LOI of about 1% and a low quality fly ash having a LOI of about 2.5% with or without the addition of CF PAC-C activated carbon, a concrete friendly activated carbon available from Calgon Corp. and present in an amount of 3% (FIG. 10). The concrete friendly activated carbon influenced air entrainment, but did not compensate for underlying ash quality issues related to high or varying native carbon content.

Example 12

Figure 11:
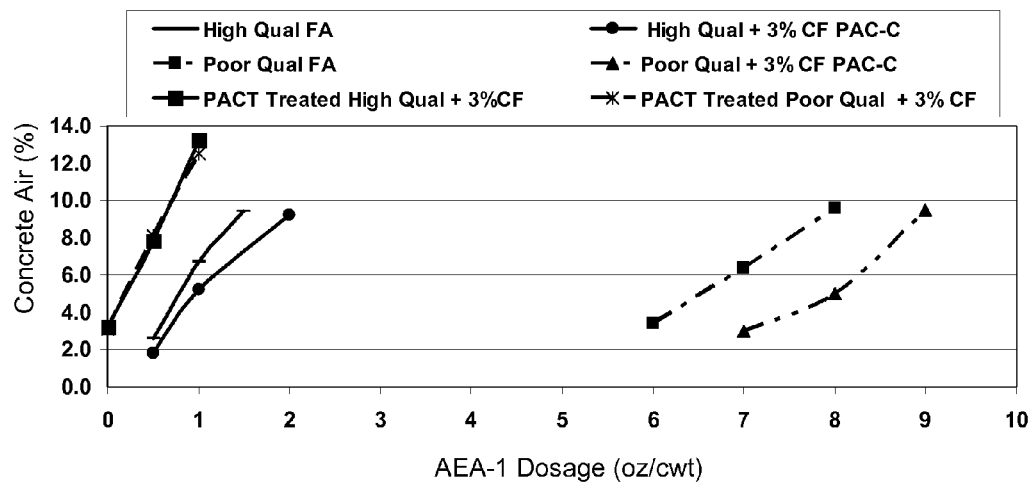
FIG. 11 is a graph illustrating the percentage of air in concrete with increasing concentrations of an air entrainment agent with high and poor quality fly ash, concrete friendly activated carbon, and sacrificial agents.

The percentage of air in concrete with increasing concentrations of air entrainment agent (AEA-1) was determined for the same high quality and low quality fly ashes from Example 11 with or without the addition of CF PAC-C activated carbon and/or PACT (FIG. 11). PACT effectively decreased the negative influence of carbon.

That which is claimed is:

1. A method of reducing or eliminating the effect of fly ash or other combustion ashes on air entrainment in an air-entraining cementitious mixture, comprising the steps of:
    forming a cementitious mixture comprising water, cement, fly ash or another combustion ash, and an air entrainment agent, and entraining air in the mixture;
    wherein a sacrificial agent is also included in the cementitious mixture in at least an amount necessary to neutralize the detrimental effects of components of said fly ash or other combustion ash on air entrainment activity, the sacrificial agent comprising a material or mixture of materials that, when present in the same cementitious mixture without fly ash or the other combustion ash in said amount, causes less than 2 vol. % additional air content in the cementitious mixture,
    wherein the sacrificial agent comprises a compound selected from the group consisting of the structure $NR^1R^2R^3$, wherein:
    $R^1$ is a substituted or unsubstituted non-alkoxylated $C_{8-25}$ alkyl, substituted or unsubstituted non-alkoxylated $C_{8-25}$ alkenyl, substituted or unsubstituted non-alkoxylated $C_{8-25}$ alkynyl, substituted or unsubstituted $C_{8-25}$ alkoxylated alkyl, substituted or unsubstituted $C_{8-25}$ alkoxylated alkenyl, or substituted or unsubstituted $C_{8-25}$ alkoxylated alkynyl; and
    $R^2$ and $R^3$ are each independently selected from hydrogen, substituted or unsubstituted $C_{1-22}$ alkyl, substituted or unsubstituted $C_{2-22}$ alkenyl, or substituted or unsubstituted $C_{2-22}$ alkynyl;
    wherein $R^2$ and $R^3$ are non-alkoxylated.

2. The method of claim 1, wherein said amount of said sacrificial agent exceeds an amount necessary to neutralize said detrimental effects of said components of said fly ash or other combustion ash.

3. The method of claim 1, wherein said fly ash or other combustion ash can vary in content of said components from a minimum content to a maximum content according to a source or batch of said fly ash or other combustion ash, and wherein said amount of said at least one sacrificial agent exceeds an amount necessary to neutralize said detrimental effects of said components of said fly ash when present in said maximum content.

4. The method of claim 1, wherein one or more of $R^1$, $R^2$, and $R^3$ is independently an alkoxylated or non-alkoxylated, substituted or unsubstituted fatty acid residue.

5. The method of claim 1, wherein said sacrificial agent comprises a compound selected from the group consisting of tridodecylamine, dodecyldimethylamine, octadecyldimethylamine, cocoalkyldimethylamines, hydrogenated tallowalkyldimethylamines, oleyldimethylamine, dicocoalkylmethylamine, N-oleyl-1,1'-iminobis-2-propanol, N-tallowalkyl-1,1'-iminobis-2-propanol, and mixtures thereof.

6. The method of claim 5, wherein said sacrificial agent comprises dodecyldimethylamine.

7. The method of claim 1, wherein $R^2$ and $R^3$ are other than hydrogen.

8. The method of claim 1, wherein said sacrificial agent comprises a compound having a hydrophobic lipophilic balance rating in the range of 5 to 20.

9. The method of claim 1, wherein said sacrificial agent comprises a compound for which $LogK_{ow}$ is in the range of $-3$ to $+2$.

10. The method of claim 1, wherein said sacrificial agent comprises a compound for which $LogK_{ow}$ is in the range of $-2$ to $+2$.

11. The method of claim 1, wherein said sacrificial agent is mixed with said air entrainment agent prior to mixing said sacrificial agent and said air entrainment agent with the fly ash or other combustion ash, cement and water.

12. The method of claim 1, wherein said sacrificial agent is mixed with the fly ash or other combustion ash prior to mixing said sacrificial agent and said fly ash or other combustion ash with said cement, water and said air entrainment agent.

13. The method of claim 1, wherein said amount of sacrificial agent is in the range of 0.01 to 2.0% by weight of said fly ash or other combustion ash.

14. The method of claim 1, wherein said amount of sacrificial agent is in the range of 0.1 to 1.0% by weight of said fly ash or other combustion ash.

15. The method of claim 1, wherein said amount of said sacrificial agent is in the range of 0.001% to 0.25% by weight of the total amount of cementitious material including said fly ash or other combustion ash.

16. The method of claim 1, wherein said amount of said sacrificial agents is in the range of 0.001% to 0.10% by weight of the total amount of cementitious material including fly ash or other combustion ash.

17. The method of claim 1, wherein said fly ash or other combustion ash consists essentially of fly ash.

18. The method of claim 1, wherein the sacrificial agent, when present in the same cementitious mixture without fly ash or the other combustion ash in said amount causes less than 1 vol. % additional air content in the cementitious mixture.

19. The method of claim 2, wherein the sacrificial agent amount used does not result in a substantial increase in air entrainment compared to providing the sacrificial agent in an amount necessary to neutralize the detrimental effects of components of said fly ash on air entrainment activity.

20. The method of claim 19, wherein the sacrificial agent causes less than 2 vol. % additional air content in the cementitious mixture without fly ash.

21. The method of claim 1, wherein said components are carbon content.

22. A method of reducing or eliminating the effect of fly ash on air entrainment in an air-entraining cementitious mixture, comprising the steps of:
   forming a cementitious mixture comprising water, cement, fly ash, and an air entrainment agent, and entraining air in the mixture;
   wherein a sacrificial agent is also included in the cementitious mixture in at least the amount necessary to neutralize the detrimental effects of the carbon content of said fly ash on air entrainment activity, the sacrificial agent comprising a material or mixture of materials that, when present in the same cementitious mixture without fly ash in said amount causes less than 2 vol. % additional air content in the cementitious mixture,
   wherein the sacrificial agent comprises a compound selected from the group consisting of the structure $NR^1R^2R^3$, wherein:
   $R^1$ is a substituted or unsubstituted non-alkoxylated $C_{8-25}$ alkyl, substituted or unsubstituted non-alkoxylated $C_{8-25}$ alkenyl, substituted or unsubstituted non-alkoxylated $C_{8-25}$ alkynyl, substituted or unsubstituted $C_{8-25}$ alkoxylated alkyl, substituted or unsubstituted $C_{8-25}$ alkoxylated alkenyl, or substituted or unsubstituted $C_{8-25}$ alkoxylated alkynyl; and
   $R^2$ and $R^3$ are each independently selected from hydrogen, substituted or unsubstituted $C_{1-22}$ alkyl, substituted or unsubstituted $C_{2-22}$ alkenyl, or substituted or unsubstituted $C_{2-22}$ alkynyl;
   wherein $R^2$ and $R^3$ are non-alkoxylated.

23. A method of addressing the variance of carbon content in fly ash used in cementitious compositions to provide a cementitious composition with a substantially constant level of air entrainment, comprising:
   forming a cementitious mixture comprising water, cement, fly ash, an air entrainment agent, and a sacrificial agent and entraining air in the mixture, wherein the fly ash has a maximum carbon content; and
   selecting a sacrificial agent for the cementitious mixture and an amount of the sacrificial agent such that the amount of the sacrificial agent exceeds the amount necessary to neutralize the maximum carbon content in the fly ash, wherein the sacrificial agent comprises a material or mixture of materials that, when present in the same cementitious mixture without fly ash in said amount causes less than 2 vol. % additional air content in the cementitious mixture, and
   wherein the sacrificial agent comprises a compound selected from the group consisting of the structure $NR^1R^2R^3$, wherein:
   $R^1$ is a substituted or unsubstituted non-alkoxylated $C_{8-25}$ alkyl, substituted or unsubstituted non-alkoxylated $C_{8-25}$ alkenyl, substituted or unsubstituted non-alkoxylated $C_{8-25}$ alkynyl, substituted or unsubstituted $C_{8-25}$ alkoxylated alkyl, substituted or unsubstituted $C_{8-25}$ alkoxylated alkenyl, or substituted or unsubstituted $C_{8-25}$ alkoxylated alkynyl; and
   $R^2$ and $R^3$ are each independently selected from hydrogen, substituted or unsubstituted $C_{1-22}$ alkyl, substituted or unsubstituted $C_{2-22}$ alkenyl, or substituted or unsubstituted $C_{2-22}$ alkynyl;
   wherein $R^2$ and $R^3$ are non-alkoxylated.

24. A method of reducing or eliminating the effect of fly ash or other combustion ashes on air entrainment in an air-entraining cementitious mixture, comprising the steps of:
   forming a cementitious mixture comprising water, cement, fly ash or another combustion ash, and an air entrainment agent, and entraining air in the mixture;
   wherein a sacrificial agent is also included in the cementitious mixture in at least an amount necessary to neutralize the detrimental effects of components of said fly ash or other combustion ash on air entrainment activity, the sacrificial agent comprising a material or mixture of materials that, when present in the same cementitious mixture without fly ash or the other combustion ash in said amount, causes less than 2 vol. % additional air content in the cementitious mixture,
   wherein the sacrificial agent comprises a compound selected from the group consisting of the structure $NR^1R^2R^3$, wherein:
   $R^1$ is a substituted or unsubstituted non-alkoxylated $C_{8-25}$ alkyl, substituted or unsubstituted non-alkoxylated $C_{8-25}$ alkenyl, substituted or unsubstituted non-alkoxylated $C_{8-25}$ alkynyl, substituted or unsubstituted $C_{8-25}$ alkoxylated alkyl, substituted or unsubstituted $C_{8-25}$ alkoxylated alkenyl, or substituted or unsubstituted $C_{8-25}$ alkoxylated alkynyl; and
   $R^2$ and $R^3$ are each independently selected from hydrogen, unsubstituted $C_{1-22}$ alkyl, unsubstituted $C_{2-22}$ alkenyl, or unsubstituted $C_{2-22}$ alkynyl;
   wherein $R^2$ and $R^3$ can be optionally alkoxylated and are not both hydrogen.

25. The method of claim 1, wherein $R^1$ is a substituted or unsubstituted non-alkoxylated $C_{10-20}$ alkyl, substituted or unsubstituted non-alkoxylated $C_{10-20}$ alkenyl, substituted or unsubstituted non-alkoxylated $C_{10-20}$ alkynyl, substituted or unsubstituted $C_{10-20}$ alkoxylated alkyl, substituted or unsubstituted $C_{10-20}$ alkoxylated alkenyl, or substituted or unsubstituted $C_{10-20}$ alkoxylated alkynyl.

26. The method of claim 22, wherein $R^1$ is a substituted or unsubstituted non-alkoxylated $C_{10-20}$ alkyl, substituted or unsubstituted non-alkoxylated $C_{10-20}$ alkenyl, substituted or unsubstituted non-alkoxylated $C_{10-20}$ alkynyl, substituted or unsubstituted $C_{10-20}$ alkoxylated alkyl, substituted or unsubstituted $C_{10-20}$ alkoxylated alkenyl, or substituted or unsubstituted $C_{10-20}$ alkoxylated alkynyl.

27. The method of claim 22, wherein said sacrificial agent comprises dodecyldimethylamine.

28. The method of claim 23, wherein $R^1$ is a substituted or unsubstituted non-alkoxylated $C_{10-20}$ alkyl, substituted or unsubstituted non-alkoxylated $C_{10-20}$ alkenyl, substituted or unsubstituted non-alkoxylated $C_{10-20}$ alkynyl, substituted or unsubstituted $C_{10-20}$ alkoxylated alkyl, substituted or unsubstituted $C_{10-20}$ alkoxylated alkenyl, or substituted or unsubstituted $C_{10-20}$ alkoxylated alkynyl.

29. The method of claim 23, wherein said sacrificial agent comprises dodecyldimethylamine.

30. The method of claim 24, wherein $R^1$ is a substituted or unsubstituted non-alkoxylated $C_{10-20}$ alkyl, substituted or unsubstituted non-alkoxylated $C_{10-20}$ alkenyl, substituted or unsubstituted non-alkoxylated $C_{10\text{-}20}$ alkynyl, substituted or unsubstituted $C_{10\text{-}20}$ alkoxylated alkyl, substituted or unsubstituted $C_{10\text{-}20}$ alkoxylated alkenyl, or substituted or unsubstituted $C_{10\text{-}20}$ alkoxylated alkynyl.

31. The method of claim 24, wherein said sacrificial agent comprises dodecyldimethylamine.

* * * * *